(12) United States Patent
Chang

(10) Patent No.: US 9,389,414 B2
(45) Date of Patent: Jul. 12, 2016

(54) LIGHT SHIELDING APPARATUS USING MAGNETIC MICROBEADS AND METHOD OF THE SAME

(71) Applicant: HON HAI PRECISION INDUSTRY CO., LTD., New Taipei (TW)

(72) Inventor: Tsung-Yao Chang, New Taipei (TW)

(73) Assignee: Regain Biotech Corp., New Taipei (TW)

(*) Notice: Subject to any disclaimer, the term of this patent is extended or adjusted under 35 U.S.C. 154(b) by 155 days.

(21) Appl. No.: 14/154,421

(22) Filed: Jan. 14, 2014

(65) Prior Publication Data
US 2014/0204440 A1    Jul. 24, 2014

(30) Foreign Application Priority Data
Jan. 21, 2013 (TW) .............................. 102102171 A

(51) Int. Cl.
*G02B 26/02* (2006.01)
*E06B 9/24* (2006.01)
*E06B 9/264* (2006.01)

(52) U.S. Cl.
CPC . *G02B 26/02* (2013.01); *E06B 9/24* (2013.01); *E06B 2009/2464* (2013.01); *E06B 2009/2646* (2013.01)

(58) Field of Classification Search
CPC ................ E06B 2009/2464; E06B 2009/2646; E06B 9/24; G02B 26/02; G02F 1/155
USPC .......................................................... 359/228
See application file for complete search history.

(56) References Cited

U.S. PATENT DOCUMENTS
2014/0320782 A1* 10/2014 Uhm et al. ...................... 349/62

FOREIGN PATENT DOCUMENTS
TW           200834114 A      8/2008

* cited by examiner

*Primary Examiner* — James Phan
(74) *Attorney, Agent, or Firm* — Novak Druce Connolly Bove + Quigg LLP

(57) ABSTRACT

A light shielding apparatus using magnetic microbeads and a method of the same are disclosed. The light shielding apparatus includes a cycling chamber defined by two transparent substrates, a fluid filled in the cycling chamber, a plurality of magnetic microbeads suspended in the fluid, and a cycling motor connected to the cycling chamber. The cycling motor has a magnetic device. When the magnetic device is powered on, the magnetic microbeads are collected by the magnetic device and restricted in the cycling motor; so that, ambient light pass through the cycling chamber and the two transparent substrates. When the magnetic device is turned off, the magnetic microbeads are recycled with the fluid in the cycling chamber and the cycling motor to block ambient light.

10 Claims, 7 Drawing Sheets

LIGHT SHIELDING APPARATUS USING MAGNETIC MICROBEADS AND METHOD OF THE SAME

TECHNICAL FIELD

The disclosure is related to a light shielding apparatus and particularly to a light shielding apparatus using magnetic microbeads to shield light and a method of the same.

DESCRIPTION OF RELATED ART

Light shielding apparatus having regular shapes are used in common place. For example, window coverings including curtains, window blinds, and window shades are used for shielding sunlight from entering houses. Window coverings are moved to a predetermined location by operating accessory parts to block out sunlight instantly.

Light shielding apparatuses are also found in displays with liquid crystal display (LCD) panels, constructed by a liquid crystal layer sandwiched by two indium tin oxide (ITO) glasses. The liquid crystals are twisted by applying a bias between the ITO glasses to allow lights from backlight modules to pass for displaying a picture. Since the light shielding apparatuses in LCD panels are constructed with ITO, the manufacturing cost is correspondingly increased with the size of LCD panels. In addition to high manufacturing cost, operating the light shielding apparatuses in LCD panels is energy-consuming. It is required to provide a light shielding apparatus to overcome these shortcomings.

BRIEF DESCRIPTION OF THE DRAWINGS

The components in the drawing are not necessarily drawn to scale, the emphasis instead being placed upon clearly illustrating the principles of a light shielding apparatus and a method of the same.

FIG. 3 and FIG. 4 are schematic diagrams showing an operation status of the light shielding apparatus when a magnetic device is turned on.

DETAILED DESCRIPTION

The disclosure will be described with references to the accompanying diagrams.

Figure 1:
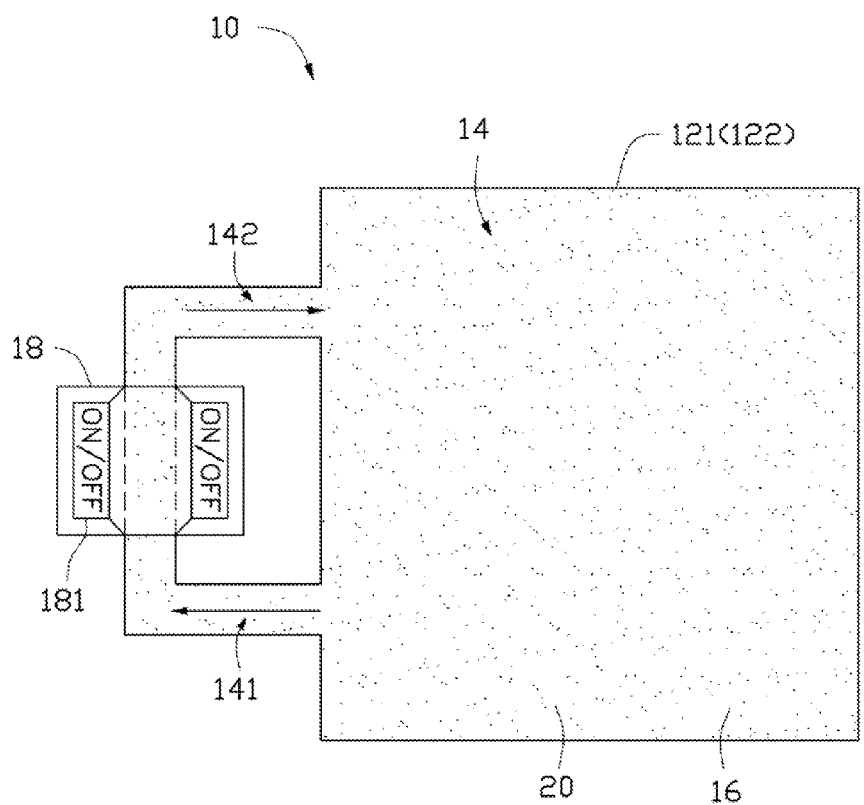
FIG. 1 and FIG. 2 are schematic diagrams showing a light shielding apparatus according to a preferred embodiment of the disclosure.
Figure 2:
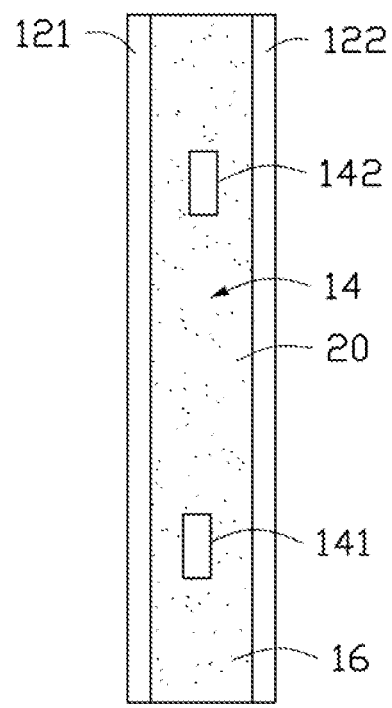

FIG. 1 and FIG. 2 show schematic diagrams of a light shielding apparatus according to a preferred embodiment of the disclosure. FIG. 2 is a side view drawing from the right side of FIG. 1.

The light shielding apparatus 10 includes a first transparent substrate 121, a second transparent substrate 122, a cycling chamber 14, a fluid 16, a cycling motor 18, and a plurality of microbeads 20. The first transparent substrate 121 and the second transparent substrate 122 are installed parallel to each other. In the present embodiment, the first transparent substrate 121 and the second transparent substrate 122 may be made of glass, plastic material, or other materials depending on the wavelength of the light. In addition, installing a holding device surrounding edges of the first transparent substrate 121 and the second transparent substrate 122 is allowable. The holding device may include a frame, a spacer, or an adhesive glue as it must maintain a predetermined gap between the first transparent substrate 121 and the second transparent substrate 122. The first transparent substrate 121, the second transparent substrate 122, and the holding device define the cycling chamber 14. In some embodiments, the cycling chamber 14 is defined by first transparent substrate 121 and the second transparent substrate 122 without the holding device. For example, the first transparent substrate 121 has portions extending from the edges of the first transparent substrate 121, and the portions are assembled to the second substrate 122 to form a closed space defining the cycling chamber 14.

The cycling chamber 16 is filled with the fluid 16 and the microbeads 20 are suspended in the fluid 16. The fluid 16 may be water, aqueous solution, gel, or other transparent materials with good fluidity. The microbeads 20 are particles with magnetic materials and are capable of reflecting or absorbing lights striking on them. Each of the microbeads 20 has a diameter substantially between 1 nanometer to 2000 nanometers.

The cycling chamber 14 connects the cycling motor 18 by an exit 141 and an entrance 142. When the cycling motor 18 is in operation, the fluid 16 leaves the cycling chamber 14 from the exit 14, enters the cycling motor 18. The fluid 16 recycles through the cycling motor 18 and into the cycling chamber 14 via the entrance 142. The cycling motor 18 drives the fluid 16 to recycle within the cycling chamber 14 and the cycling motor 18. The velocity of the fluid 16 may be modulated as required.

The cycling motor 18 has a magnetic device 181. When the magnetic device 181 is turned on, the microbeads 20 in the fluid 16 are attracted by magnetic force and collected within the cycling motor 18.

Figure 3:
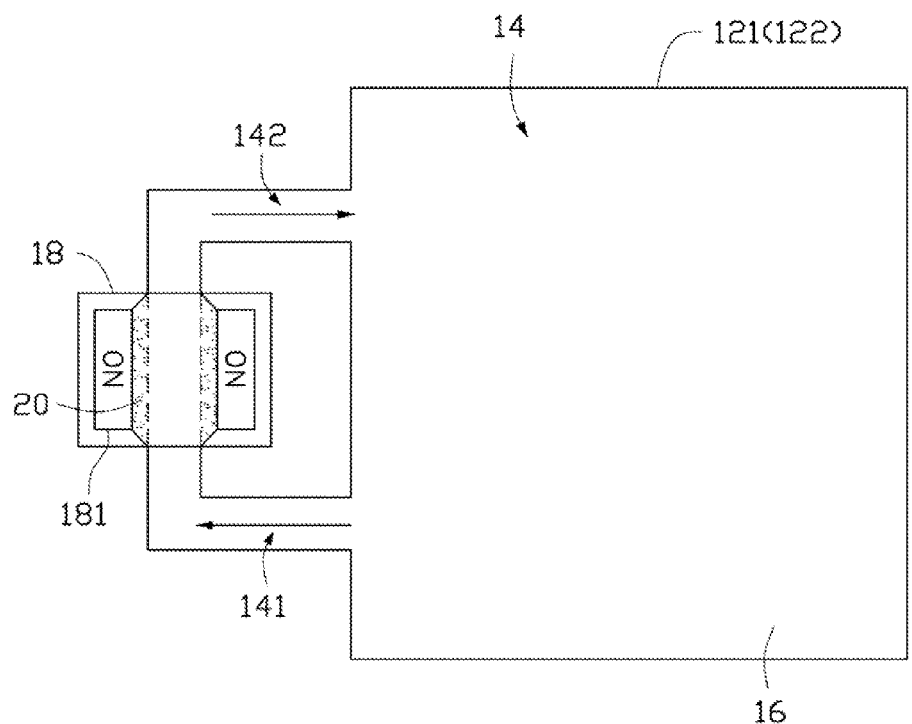
Figure 4:
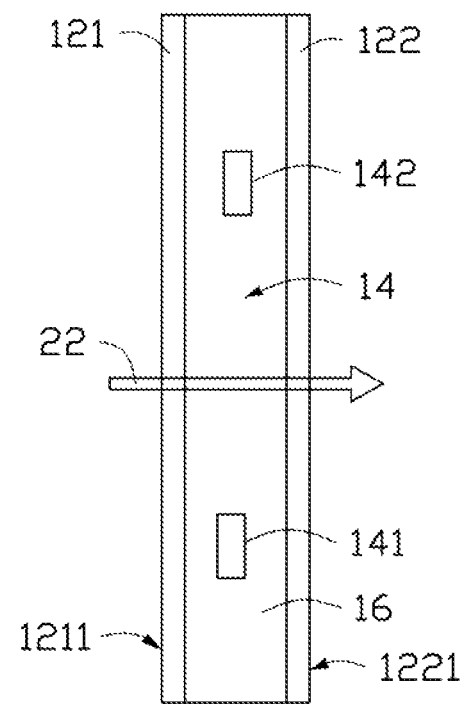

FIG. 3 and FIG. 4 are schematic diagrams showing an operation status of the light shielding apparatus 10 when the magnetic device 181 is turned on. FIG. 4 is a side view drawing from the right side of FIG. 3. When the cycling motor 18 is in operation, the microbeads 20 move within the cycling chamber 14 and the cycling motor 18, simultaneously with the flowing fluid 16, meanwhile, the magnetic device 181 is turned on to produce a magnetic field. Most of the microbeads 20 are therefore attracted and are collected within the cycling motor 18 and the fluid 16 recycles through the cycling chamber 14. When the strength of the magnetic field is over a threshold, only the fluid 16 recycles within the cycling motor 18 and the cycling chamber 14. As shown in FIG. 4, a first light 22, which is ambient light in the environment where the light shielding apparatus 10 is placed, strikes an outer surface 1211 of the first transparent substrate 121, passes through the fluid 16 in the cycling chamber 14 and leaves from an outer surface 1221 of the second transparent substrate 122. The first light 22 easily passes through the cycling chamber 14 from one side to the other side.

Figure 5:
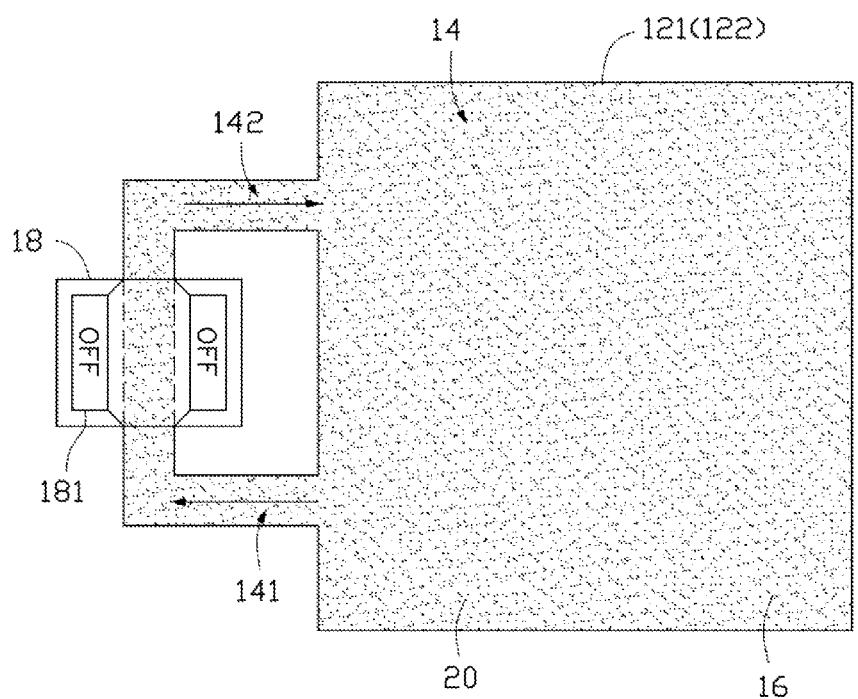
FIG. 5 and FIG. 6 are schematic diagrams showing another operation status of the light shielding apparatus when the magnetic device is turned off.
Figure 6:
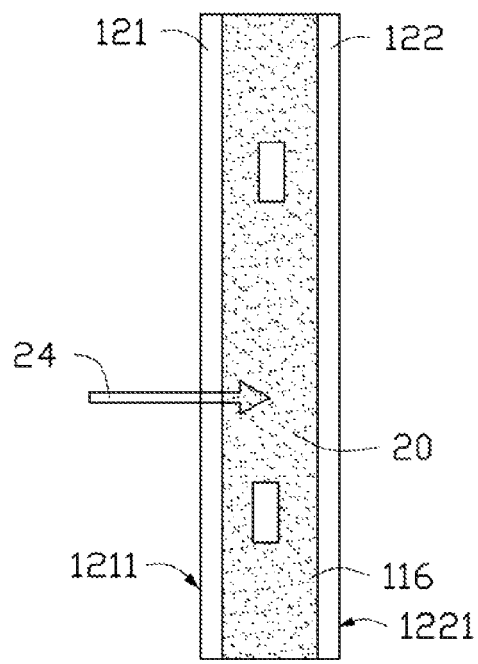

FIG. 5 and FIG. 6 are schematic diagrams showing another operation status of the light shielding apparatus 10 when the magnetic device 181 is turned off. FIG. 6 is a side view drawing from the right side of FIG. 5. When the cycling motor 18 is in operation, the microbeads 20 move within the cycling chamber 14 and the cycling motor 18, simultaneously with the flowing fluid 16. In addition, the magnetic device 181 is turned off, the microbeads 20 keep flowing within the fluid 16 in the cycling motor 18. The microbeads 20 are dispersed in the fluid 16 and therefore are dispersed in the cycling chamber 14 and the cycling motor 18. These microbeads 20 block or absorb ambient light and hinder ambient light from passing through the cycling chamber 14 from one side to the other side.

The penetration rate of ambient light is correlated to the number of the microbeads 20, the concentration of the microbeads 20 in the fluid 14, and the distance of the gap between the first transparent substrate 121 and the second transparent substrate 122. In other words, the number of the microbeads 20, the concentration of the microbeads 20 in the fluid 16, or the distance of the gap between the first transparent substrate 121 and the second transparent substrate 122 is greater; the penetration rate of ambient lights is lower. On the other hand, the strength of the magnetic field provided by the magnetic device 181 is greater; the penetration rate of ambient light is lower. In some circumstances, light shielding efficiency of the light shielding apparatus 10 ma be up to 99%. For example, when the magnetic device 181 is turned off, the microbeads 20 flow with the fluid 16 and recycles in the cycling chamber 14 and the cycling motor 18, second light 24, which is ambient light from the environment where the light shielding apparatus is placed, strikes the outer surface 1211 of the first transparent substrate 121, and are absorbed or blocked by the microbeads 20 (see FIG. 6). No light passes through the cycling chamber 14, the second transparent substrate 122, and the outer surface 1221 of the second transparent substrate 122. The second light 24 is substantially blocked by magnetic beads 20 in the cycling chamber 14 from passing through one side to the other side.

Figure 7:
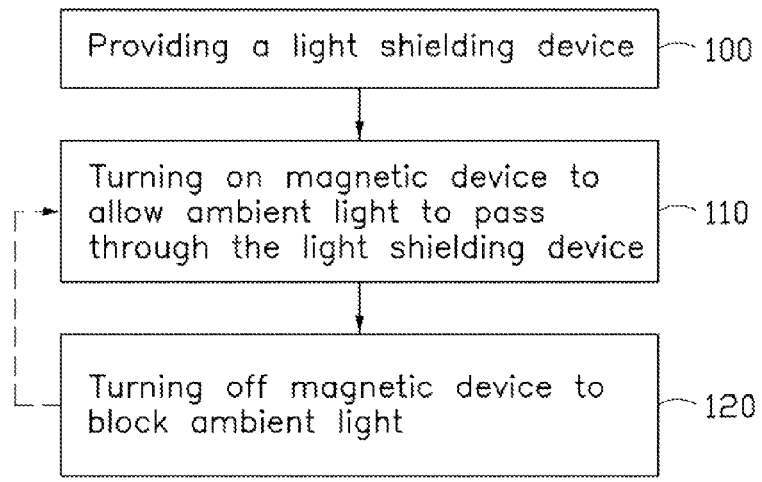
FIG. 7 shows a method of shielding light using the light shielding apparatus of the disclosure.

Accordingly, the disclosure provides a light shielding apparatus using microbeads and a method of shielding light by turning on or off the magnetic device 181. The method of shielding light is shown in FIG. 7. In step 100, a light shielding apparatus 10 of the disclosure is provided. Elements of the light shielding apparatus 10 are described in previous paragraphs. In step 110, the magnetic device 181 is turned on and the magnetic beads 20 are collected in the cycling motor 18 (also referring to FIGS. 3-4). Therefore, ambient light (e.g. the first light 22) from the environment is allowed to pass through the first transparent substrate 121, the cycling chamber 14 and the second transparent substrate 122. In step 120, the magnetic device 181 is turned off and the magnetic heads 20 are dispersed in the cycling chamber 14 (also referring to FIGS. 5-6). Accordingly, ambient light (e.g. the second light 24) from the environment is blocked by the magnetic beads 20 in the cycling chamber. In addition, step 110 and step 120 may be repeated in a predetermined frequency as required.

The light shielding apparatus of the disclosure and the method of the same may be applied as smart glass using as a construction material for windows or partitions. The light shielding apparatus and the method may also be applied as a component of LCD panels in TV to control passage of lights coming from the backlight modules. The use of the light shielding apparatus of the disclosure and the method may be applied to many other elements managing light. Furthermore, the light shielding apparatus of the disclosure and the method may also apply to provide gray scales.

It to be understood, however, that even though numerous characteristics and advantages of the present embodiments have been set fourth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A light shielding apparatus, comprising:
   a cycling chamber defined by a first transparent substrate and a second transparent substrate;
   a fluid tilled in the cycling chamber, wherein the fluid is transparent;
   a plurality of microbeads suspending in the fluid; and
   a cycling motor connecting to the cycling chamber, the cycling motor driving the fluid to recycle in the cycling chamber, wherein the cycling motor comprises a magnetic device;
   wherein when the magnetic device is turned on, the plurality of microbeads are collected by the magnetic device, and the first transparent substrate, the cycling chamber, and the second transparent substrate are permissible for ambient light to pass through; and
   wherein when the magnetic device is turned off, the plurality of microbeads are dispersed in the fluid to block ambient light from passing through the cycling chamber.

2. The light shielding apparatus of claim 1, wherein the cycling motor connects the cycling chamber through tin exit and an entrance, where the fluid leaves the cycling chamber from the exit and flows into the cycling motor, and recycles through the cycling motor via the entrance into the cycling chamber.

3. The light shielding apparatus of claim 1, wherein each of the plurality of microbeads has a diameter between 1 nanometer to 2000 nanometers.

4. The light shielding apparatus of claim 1, wherein the fluid comprises water, aqueous solution, or gel.

5. The light shielding apparatus of claim 1, wherein the plurality of microbeads are capable of reflecting lights or absorbing lights.

6. A method of shielding light, comprising the steps of:
   providing a light shielding apparatus which comprises:
     a cycling chamber defined by a first transparent substrate and a second transparent substrate;
     a fluid filled in the cycling chamber, wherein the fluid is transparent;
     a plurality of microbeads suspending in the fluid; and
     a cycling motor connecting to the cycling chamber, the cycling motor driving the fluid flowing in the cycling chamber, wherein the cycling motor comprises a magnetic device;
   turning on the magnetic device to allow ambient light to pass through, wherein the plurality of microbeads are collected by the magnetic device, and the first transparent substrate, the cycling chamber, and the second transparent substrate are permissible for ambient light; and
   turning off the magnetic device to block ambient light, wherein the plurality of microbeads are dispersed in the fluid to blow ambient light from passing through the cycling chamber.

7. The method of claim 6, wherein the cycling motor connects the cycling chamber through an exit and an entrance, where the fluid leaves the cycling chamber from the exit and flows into the cycling motor, and leaves the cycling motor through the entrance into the cycling chamber.

8. The method of claim 6, wherein each of the plurality of microbeads has a diameter between 1 nanometer to 2000 nanometers.

9. The method of claim 6, wherein the fluid comprises water, aqueous solution, or gel.

10. The method of claim 6, wherein the plurality of microbeads are capable of reflecting lights or absorbing lights.

* * * * *